United States Patent
Reyes, Jr. et al.

(10) Patent No.: US 8,551,620 B2
(45) Date of Patent: Oct. 8, 2013

(54) MULTI-LAYER AIRCRAFT ADHESIVE

(75) Inventors: Alfredo M. Reyes, Jr., N. Hollywood, CA (US); Michael A. Cosman, Valencia, CA (US); Apolinar R. Quinto, Walnut, CA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 506 days.

(21) Appl. No.: 12/644,266

(22) Filed: Dec. 22, 2009

(65) Prior Publication Data

US 2010/0159238 A1 Jun. 24, 2010

Related U.S. Application Data

(63) Continuation-in-part of application No. 11/147,573, filed on Jun. 8, 2005, now Pat. No. 7,875,149.

(51) Int. Cl.
| | | |
|---|---|---|
| *B32B 25/16* | (2006.01) | |
| *B32B 27/20* | (2006.01) | |
| *B32B 27/22* | (2006.01) | |
| *B32B 27/26* | (2006.01) | |
| *B32B 27/38* | (2006.01) | |

(52) U.S. Cl.
USPC .................... 428/413; 428/447; 428/521

(58) Field of Classification Search
None
See application file for complete search history.

(56) References Cited

U.S. PATENT DOCUMENTS

| | | | |
|---|---|---|---|
| 4,204,374 A | 5/1980 | Olson | |
| 4,335,187 A | 6/1982 | Rukavina et al. | |
| 4,808,690 A | 2/1989 | Slagel | |
| 4,905,935 A | 3/1990 | Uram, Jr. | |
| 5,270,518 A | 12/1993 | Naoumenko et al. | |
| 6,486,269 B2 | 11/2002 | Zook et al. | |

FOREIGN PATENT DOCUMENTS

| | | |
|---|---|---|
| DE | 198 32 686 A1 | 2/2000 |
| DE | 198 58 921 A1 | 6/2000 |
| DE | 100 17 783 A1 | 10/2001 |
| EP | 0 618 068 A1 | 10/1994 |
| EP | 1 380 626 A1 | 1/2004 |
| JP | 2004 359808 | 12/2004 |
| WO | 89/11513 A1 | 11/1989 |
| WO | 98/55545 A1 | 12/1998 |
| WO | 2005/063872 A2 | 7/2005 |

OTHER PUBLICATIONS

International Search Report, PCT/US2006/021394, dated Oct. 20, 2006.
U.S. Appl. No. 13/008,417, filed Jan. 18, 2011, Reyes, Jr. et al.

*Primary Examiner* — Ramsey Zacharia
(74) *Attorney, Agent, or Firm* — Andrew C. Siminerio

(57) ABSTRACT

A multi-layer aircraft adhesive composition is provided having a first layer prepared from a first composition having a Part A and a Part B. Part A contains a plasticizer, a crosslinking agent, and an adhesion promoter. Part B contains a moisture resister and an abrasion resister. The composition has a second layer formed over at least a portion of the first layer. The second layer is prepared from a second composition having a Part C and a Part D. Part C contains at least one polythiol functional polymer, at least one epoxy resin, at least one sulfur containing material that is different from the at least one polythiol functional polymer, at least one plasticizer, and at least one filler. Part D contains at least one plasticizer, at least one of manganese dioxide or lead oxide, and at least one alkaline agent.

23 Claims, No Drawings

MULTI-LAYER AIRCRAFT ADHESIVE

CROSS-REFERENCE TO RELATED APPLICATION

This application is a continuation-in-part of U.S. patent application Ser. No. 11/147,573, now U.S. Pat. No. 7,875,149. This application is related to U.S. application Ser. No. 13/008,417, which is a continuation of U.S. patent application Ser. No. 11/147,573 (now U.S. Pat. No. 7,875,149).

BACKGROUND OF THE INVENTION

1. Field of the Invention

The present invention relates to a multi-layer aircraft adhesive useful as an aircraft hump seal and also to a method for applying a multi-layer aircraft adhesive to an aircraft transparency, such as an aircraft window or windshield.

2. Technical Considerations

Aircraft windshields are as important to the structure of the fuselage as are the aluminum or composite panels that make up the rest of the pressurized aircraft vessel. Because they face forward, windshields must be able to protect the flight crew from impacts from birds and other objects, and they have to be sufficiently transparent and relatively free from optical distortion so as not to impair vision therethrough. Windshields, whether plastic and/or glass, typically are laminated structures formed by windshield panels bonded together by an interlayer. The number and shape of windshield panels depends on the requirements of the airframe designer. Generally, the outermost panel covers a windshield de-icing film that is electrically connected to a bus bar assembly. The interlayers between the panels are generally made of vinyl or urethane, or a mixture thereof. A delamination in the strict sense of the word is a failure of the interlayer between two panels. Delamination can be clear where panels separate or debond completely, or delamination can be cloudy when moisture creeps in between the panels. Delamination is only one example of undesirable occurrences that can damage the windshields. Windshields can also be damaged by bubble formation, discoloration, electrical de-icing failure, scratches, moisture seal erosion, interlayer degradation and peel chipping.

Usually, the first step in an aircraft windshield failure is a loss of integrity of the moisture seals or "hump seals". Hump seals are formed over seams or interfaces between adjacent components, such as between the windshield and the adjacent metal framework. An aged or eroded hump seal often is the culprit. Moisture can seep into and corrode the urethane interlayer, which can lead to debonding at the glass/interlayer interface. If hump seal maintenance is not done, additional moisture can corrode the bus bar-to-deicing film junction interface. This corrosion can create microscopic breaks in the conductor path that can produce arcing and ultimately result in the fracture of the outboard glass panel. The appearance of delamination and/or discoloration in the edge of a windshield usually means that the hump seal is failing. If the seal is repaired immediately, the delamination can usually be stopped.

In aircraft manufacture and maintenance, the hump seals typically include only one adhesive that blocks moisture vapor transmission to the susceptible interlayers between the glass or plastic plies. The adhesive also provides abrasion resistance to air, dust, and/or rain exposure. Typical adhesives used for hump seals in aircraft transparencies are polysulfide type or silicone-based adhesives having slow curing rates and poor low temperature properties.

Therefore, a need exists to provide a multi-layer aircraft adhesive for aircraft transparencies, such as windshields and windows, that is fast curing, provides improved moisture vapor transmission blockage, and improved abrasion resistance.

SUMMARY OF THE INVENTION

In one non-limiting embodiment, a multi-layer aircraft adhesive composition useful as an aircraft hump seal is provided. The multi-layer composition has a first layer prepared from a first composition having a Part A and a Part B. Part A contains a plasticizer, a crosslinking agent, and an adhesion promoter. Part B contains a moisture resister and an abrasion resister. Further, the first layer is substantially sulfide free. The multi-layer composition has a second layer directly or indirectly formed over at least a portion of the first layer. The second layer is prepared from a second composition having a Part C and a Part D. Part C contains (i) at least one polythiol functional polymer, (ii) at least one epoxy resin, (iii) at least one sulfur containing material that is different from the at least one polythiol functional polymer, (iv) at least one plasticizer, and (v) at least one filler. Part D contains (i) at least one plasticizer, (ii) at least one of manganese dioxide or lead oxide, and (iii) at least one alkaline agent.

In a further non-limiting embodiment, the multi-layer composition has a first layer prepared from a first composition having a Part A and a Part B. Part A contains a plasticizer, a crosslinking agent, and an adhesion promoter. Part B contains a moisture resister and an abrasion resister. Further, the first layer is substantially sulfide free. The multi-layer composition has a second layer directly or indirectly formed over at least a portion of the first layer. The second layer is prepared from a second composition having a Part C and a Part D. Part C contains (i) at least one polythiol functional polymer, (ii) at least one epoxy resin, (iii) sulfur, (iv) partially hydrogenated terphenyl, (v) silica, (vi) calcium carbonate, and (vii) carbon black. Part D contains (i) partially hydrogenated terphenyl, (ii) at least one of manganese dioxide or lead oxide, and (iii) dipentamethylene thiuram tetrasulfide.

In a further non-limiting embodiment, the multi-layer composition has a first layer prepared from a first composition having a Part A and a Part B. Part A contains alkyl benzyl phthalate or phthalate ester or both, an isocyanate-containing compound, and an epoxy silane. Part B contains polybutadiene and aluminum hydroxide. Further, the first layer is substantially sulfide free. The multi-layer composition has a second layer directly or indirectly formed over at least a portion of the first layer. The second layer is prepared from a second composition having a Part C and a Part D. Part C contains (i) at least one polythiol functional polymer, (ii) at least one epoxy resin, (iii) sulfur, (iv) partially hydrogenated terphenyl, (v) silica, (vi) calcium carbonate, and (vii) carbon black. Part D contains (i) partially hydrogenated terphenyl, (ii) at least one of manganese dioxide or lead oxide, and (iii) dipentamethylene thiuram tetrasulfide.

DETAILED DESCRIPTION OF THE INVENTION

As used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims are approximations that may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to include the beginning and ending range values and to encompass any and all sub-ranges subsumed therein. For example, a stated range of "1 to 10" should be considered to include any and all sub-ranges between (and inclusive of) the minimum value of 1 and the maximum value of 10; that is, all sub-ranges beginning with a minimum value of 1 or more and ending with a maximum value of 10 or less, e.g., 5.5 to 10, 3.7 to 6.4, or 1 to 7.8, just to illustrate a few. The term "charge" means to add to the mixture.

The first layer of the multi-layer aircraft adhesive according to the present invention generally comprises an accelerator component (Part A) and a base component (Part B). Each component can contain one or more of each of the following: plasticizers, surfactants, crosslinking agents, adhesion promoters, moisture resisters, hardening agents, polymers, abrasion resisters, fillers, catalysts, ultraviolet (UV) light and ozone blockers, desiccants, and desiccant-forming compounds. As discussed herein, one purpose of the first layer of the aircraft adhesive of the invention is to cover the surface of an aircraft transparency and fill the gap between an aircraft transparency, such as a windshield, and the aircraft frame. The first layer of the aircraft adhesive of the present invention creates a hump at the windshield airframe interface, typically referred to in the art as a "hump seal". The aircraft adhesive protects the transparency from harsh wind and water, and is sacrificial so that the glass and the frame of the aircraft are not abraded. Further, the first layer of the multi-layer adhesive of the present invention is "substantially sulfide free", meaning less than 5 wt % sulfide based upon the total weight of the composition, such as less than 4 wt %, such as less than 3 wt %, such as less than 2 wt %, such as less than 1 wt %, such as no intentional addition of sulfide material to the composition of the first layer.

The present invention is useful as a multi-layer adhesive composition for many types of aircraft, ranging from cargo planes to jets to helicopters, etc.

The first layer of the multi-layer aircraft adhesive according to the present invention can be formed from a multi-component system, e.g., Part A and Part B. Part A can be generally characterized as an accelerator and can contain one or more of each of the following: plasticizers, crosslinking agents and adhesion promoters. In one particular non-limiting embodiment, Part A contains one or more of each of the following: plasticizers, surfactants, UV and ozone resisters, expanders, crosslinkers and adhesion promoters.

Plasticizers for Part A of the first layer include, but are not limited to, alkyl benzyl phthalate and phthalate ester. However, other plasticizers now known or heretofore developed can be used in combination with or in place of the alkyl benzyl phthalate and/or phthalate ester. Use of a linear or a branched-linear plasticizer is particularly useful because it provides for better low temperature properties, increased fogging resistance, and decreased crazing. By increased fogging resistance is meant that less cloudiness is imparted to the laminate due to moisture being adsorbed into and discoloring the laminate interlayer under typical operating environments, including high moisture conditions. Crazing is a term of art for stress cracking caused by the application of some sealants on polycarbonate or acrylics. The phthalate plasticizers of preference for the invention, as discussed above, have less aromaticity, thus, decreasing the attack on polycarbonate or acrylic surfaces that causes crazing.

Crosslinking agents for Part A of the first layer can be selected from a variety of isocyanate compounds. In one non-limiting embodiment, methylene diisocyanate (MDI) in its polymeric form is used as it provides a strong reaction with a component of Part B that will be discussed further herein. Other crosslinking agents can be substituted for an isocyanate as long as it will react with a component of Part B.

Adhesion promoters for Part A of the first layer can be selected from suitable silane compounds. In one non-limiting embodiment, epoxy silane is used as the adhesion promoter for Part A in order to provide for a polysulfide-free composition. An amino silane can be substituted for the epoxy silane.

A UV and ozone resister for Part A of the first layer can be carbon black or colloidal carbon. However, aniline may also be used.

Expanders for Part A of the first layer can be selected from any fumed silica product. Cabosil TS-720, commercially available from Cabot Corporation, is a non-limiting example of one suitable fumed silica for Part A.

Surfactants for Part A of the first layer can be selected from any surface active agents now known or heretofore developed in the adhesive art. In one non-limiting embodiment, a polymeric fatty ester is used as the surfactant for the present invention.

Part B of the first layer of the present invention is generally characterized as a base and generally contains one or more of each of the following: moisture resisters and abrasion resisters. In one particular non-limiting embodiment, Part B of the first layer contains one or more of each of the following: moisture resisters, abrasion resisters, plasticizers, hardeners, reactors, fillers, UV and ozone resisters, adhesion promoters, desiccants, catalysts and strengtheners.

A non-limiting example of a suitable moisture resister for Part B of the first layer is hydroxyl terminated polybutadiene. As discussed briefly below, the hydroxyl groups of the hydroxyl terminated polybutadiene can react with the isocyanate groups of the polymeric MDI of Part A to crosslink.

One example of an abrasion resister for Part B of the first layer is aluminum hydroxide. The aluminum hydroxide not only acts as an abrasion resister, but also as a filler and provides moisture resistance. However, any suitable abrasion resister now known or heretofore developed in the adhesive art may be used instead of or in addition to aluminum hydroxide.

Plasticizers for Part B of the first layer include phthalate ester. However, other plasticizers now known or heretofore developed can be used in combination with or in place of the phthalate ester. As discussed above, use of the linear phthalate ester provides improved low temperature properties, increased fogging resistance, and no crazing.

One example of a hardening agent for Part B of the first layer is N,N Bis(2 hydroxypropyl) aniline. However, virtually any polyol can be used.

One example of a reactor for Part B of the first layer is 2-Oxepanone polymer with 2,2-bis(hydroxymethyl)-1,3-propanediol, which can react with the isocyanate of the Polymeric MDI of Part A. Another suitable reactor is an oligomeric diamine.

Fillers for Part B of the first layer include calcium carbonate. However, any filler now known or heretofore developed in the adhesive art can be used in combination with or in place of the calcium carbonate.

Examples of a UV and ozone resister for Part B of the first layer are carbon black or colloidal carbon. However, aniline can also be used.

One example of an adhesion promoter for Part B of the first layer is C12-C13 linear primary alcohol. Suitable alternatives include C7-C15 linear primary alcohols.

In one non-limiting embodiment of the present invention, Part B of the first layer may also contain calcium hydroxide as a desiccant and calcium oxide as a desiccant promoter. The calcium oxide reacts with water present in the air to form additional calcium hydroxide. The desiccants absorb the carbon dioxide that is formed via the reaction of water and the isocyanates present in the adhesive. This absorption prevents foaming.

Catalysts for Part B of the first layer include, but are not limited to, formic acid blocked tertiary amine and organometallics. The formic acid blocked tertiary amine is particularly useful because organometallics can cause reactions to go too fast. The formic acid blocked tertiary amine is easier and more predictable to control.

In one non-limiting embodiment, Part B of the first layer can also include alkali metal aluminum silicate as a strengthener. However, suitable alternatives now known or heretofore developed in the adhesive art can be used.

In one non-limiting embodiment, the first layer of the aircraft adhesive according to the present invention comprises two parts, Part A and Part B. Part A is generally characterized as an accelerator containing alkyl benzyl phthalate, polymeric fatty ester surfactant, carbon black, phthalate ester plasticizer, silica (e.g., Cabosil TS-720), polymeric MDI (methylene diisocyanate), and epoxy silane to a total weight of 100%. Part B is generally characterized as a base containing hydroxyl terminated polybutadiene, phthalate ester plasticizer, N,N Bis(2 hydroxypropyl) aniline, 2-oxepanone, polymer with 2,2-bis(hydroxymethyl)-1,3-propanediol, calcium carbonate, aluminum hydroxide, carbon black, C12-C13 linear primary alcohol, calcium oxide, calcium hydroxide, formic acid blocked tertiary amine, alkali metal aluminum silicate to a total weight of 100%.

In Part A of the first layer, the alkyl benzyl phthalate functions as a plasticizer and can be added at a range from 2 wt % to 25 wt %, such as 6 to 18 wt %, e.g., 12.65 wt %. The polymeric fatty ester surfactant functions as a surfactant and can be added at a range from 0.01 to 0.20 wt %, such as 0.05 to 0.15 wt %, e.g., 0.10 wt % and mixed with the alkyl benzyl phthalate. The carbon black can be present at a range from 0.4 to 7 wt %, such as 2 to 6 wt %, e.g., 3.45 wt %, to provide UV and ozone resistance. The phthalate ester plasticizer functions as a plasticizer and can be present at a range from 10.5 to 40 wt %, such as 16 to 29 wt %, e.g., 22.65 wt. %. In one non-limiting embodiment of the invention (see Example 1, Table 1), the phthalate ester plasticizer is added in two parts to Part A, for example, a first amount of phthalate ester plasticizer that ranges from 10 to 35 wt %, such as 15 to 25 wt %, e.g., 20.65 wt % of Part A and a second amount of phthalate ester plasticizer that ranges from 0.5 to 5 wt %, such as 1 to 4 wt %, e.g., 2 wt % of Part A. The silica (e.g., Cabosil TS-720) functions as an expander and can be present at a range from 0.1 to 4 wt %, such as 1 to 3 wt %, e.g., 2.15 wt %. The polymeric MDI (methyl diisocyanate) can be present at a range from 40 to 60 wt %, such as 45 to 55 wt %, e.g., 50 wt %. The polymeric MDI reacts with the base and is used as a cross-linker with the hydroxyl terminated polybutadiene of Part B (described below). The epoxy silane can be present at a range from 8 to 10 wt %, such as 8.5 to 9.5 wt %, e.g., 9 wt %. The epoxy silane functions as an adhesion promoter. With Part A having a total wt % of 100, a lab check of the above particular non-limiting embodiment of Part A should indicate approximately 13.0 to 14.0% free isocyanate, with a viscosity of approximately 15 to 25 centipoises.

In Part B of the first layer, the hydroxyl terminated polybutadiene functions to provide moisture resistance to the aircraft adhesive and can be present at a range from 25 to 45 wt %, such as 30 to 40 wt %, e.g., 33.97 wt %. The hydroxyl groups of the hydroxyl terminated polybutadiene can react with the isocyanate of the polymeric MDI of Part A to crosslink. Phthalate ester plasticizer, which functions as a plasticizer, can be present at a range from 1 to 15 wt %, such as 4 to 10 wt %, e.g., 6.80 wt %. The N,N Bis(2 hydroxypropyl) aniline functions as a hardener and can be present at a range from 0.01 to 1 wt %, such as 0.25 to 0.75 wt %, e.g., 0.34 wt %. 2-oxepanone, polymer with 2,2-bis(hydroxymethyl)-1,3-propanediol can be present at from 0.01 to 2 wt %, such as 0.5 to 1.5 wt %, such as at 1.01 wt %. The 2-oxepanone, polymer with 2,2-bis(hydroxymethyl)-1,3-propanediol is present to also react with the isocyanate groups of the polymeric MDI of Part A. The calcium carbonate, which functions as a filler, can be present at a range from 7 to 27 wt %, such as 15 to 20 wt %, e.g., 17 wt %. Aluminum hydroxide, which functions as an abrasion and moisture resister, can be present at a range from 25 to 45 wt %, such as 30 to 40 wt %, e.g., 33.97 wt %. Carbon black functions as a UV and ozone resister and can be present at a range from 0.5 to 6 wt %, such as 2 to 5 wt %, e.g., 3.40 wt %. C12-C13 linear primary alcohol can be added at from 0.05 to 0.50 wt %, such as 0.20 to 0.30 wt %, such as at 0.25 wt %. The function of the alcohol is to promote adhesion. The calcium oxide can be present at a range from 0.01 to 1.00 wt %, such as 0.25 to 0.75 wt %, e.g., 0.51 wt %. The function of the calcium oxide is to react with water to become calcium hydroxide, a desiccant. More calcium hydroxide, which functions as a desiccant can be added at a range from 0.01 to 2 wt %, such as 0.50 to 1.50 wt %, e.g., 1.02 wt %. The formic acid blocked tertiary amine (catalyst) can be present at a range from 0.01 to 0.05 wt %, such as 0.02 to 0.04 wt %, e.g., 0.03 wt %. The alkali metal aluminum silicate can be present at a range from 0.01 to 3 wt %, such as 1.0 to 2.0 wt %, e.g., 1.70 wt %. Part B then has a total wt % of 100.

As discussed previously, Part A of the first layer functions as an accelerator, and Part B of the first layer functions as a base. In one non-limiting embodiment of the present invention, the two components are mixed at a ratio of Part B:Part A ranging from 100:11 to 100:13, e.g., Part B-100 to Part A-12 (that is, 100 parts by weight of B and 12 parts by weight of A meaning 10.7 wt. % of Part A (12/112*100=10.7%) and 89.3 wt. % of Part B (100/112*100=89.3%). The mixed components can then be vacuum degassed. However, if the isocyanate of Part A is increased, the amount of Part B will also need to be increased stoichiometrically.

To package the composition of the first layer, the resulting mixture can be filled in 2 oz. (59.1 cm$^3$), 6 oz. (177.4 cm$^3$) and 12 oz. (354.8 cm$^3$) cartridges and then frozen in dry ice or dry ice with mineral spirits at −70° C. (−94° F.) or lower, and stored at −62.2° C. (−80° F.). The shelf life of a premixed and frozen aircraft adhesive of the present invention is at least 30 days at −80° F. (−62.2° C.). The premixed and frozen material can be used by thawing in a 120° F. (48.8° C.) water bath for five to six minutes, or at ambient temperature for 30 minutes, and applied in a conventional manner, such as by using a Semco® gun commercially available from PPG Aerospace—PRC Desoto International. An injection style Semkit® package commercially available from PPG Aerospace—PRC Desoto International can also be used. This is a complete package assembly that stores, mixes, and applies sealant and is available in 2 oz. (59.1 cm³) and 6 oz. (177.4 cm³). A Semkit® package that contains Part A and Part B of the first layer in separate compartments has a shelf-life of approximately six months at ambient temperatures.

To make flow adjustments, silica may be added to Part B (the base) if a reduced flow of Part B is desired. Hence, the addition of extra silica will then affect the flow of the entire first layer of the aircraft adhesive when Parts A and B are mixed.

The first layer of the multi-layer aircraft adhesive of the present invention also exhibits desirable low temperature properties. For example, the first layer of the aircraft adhesive may be applied to a substrate at approximately ⅛ of an inch thickness (0.32 cm), then put in a cold bath at −65° F. (−53.8° C.) for approximately six hours. The first layer of the aircraft adhesive can then be bent to a desirable form. Most other aircraft adhesives would break at this cold temperature; the first layer of the aircraft adhesive of the present invention will not.

As discussed herein, the purpose of an aircraft adhesive is to fill the gap between an aircraft transparency, such as a windshield, and the aircraft frame. The first layer of the multi-layer aircraft adhesive of the present invention fills the gap and creates a hump seal spanning between the windshield and frame. The purpose of the aircraft adhesive is to seal the transparency from harsh wind and water. The aircraft adhesive is sacrificial so that the glass and the frame of the aircraft are not abraded. The first layer of the multi-layer aircraft adhesive outperforms traditional polybutadienes and blocks moisture vapor transmission, hence preventing fogging, i.e., clouding of the windshield. The first layer of the multi-layer aircraft adhesive matches or exceeds the abrasion resistance of currently used polysulfide-containing adhesives and also provides for quick curing. The first layer of the multi-layer aircraft adhesive is extremely hydrolytically resistant and stable. It does not degrade in the presence of water. A typical polyurethane-based adhesive would not allow such severe moisture exposure.

The following Example 1 illustrates a specific adhesive incorporating features of the first layer of the invention. However, it is to be understood that this is just one illustrative example of the first layer of the multi-layer adhesive and that the first layer is not limited to Example 1.

Example 1

As shown in Table 1, the components, amounts, and procedure for making Part A of the first layer were as follows:

TABLE 1

| PART A | | |
|---|---|---|
| | wt % | Procedure |
| Alkyl Benzyl Phthalate | 12.65 | Charge. |
| Polymeric Fatty Ester Surfactant | 0.10 | Charge and mix. |
| Carbon Black | 3.45 | Charge and mix. |
| Phthalate Ester Plasticizer | 20.65 | Charge and mix. |
| Cabosil TS-720, Silica | 2.15 | Charge and mix with high speed. Check grind. |
| Phthalate Ester Plasticizer | 2.00 | Charge and mix. Pull vacuum for 10-15 minutes at −30 inches Hg (−101,571 Pa). |

TABLE 1-continued

| PART A | | |
|---|---|---|
| | wt % | Procedure |
| Polymeric MDI | 50.00 | Charge and mix slowly. |
| Epoxy Silane | 9.00 | Charge and mix slowly. Pull vacuum for 10-15 minutes at −30 inches Hg (−101,571 Pa). |
| Total Weight | 100.00 | |

As shown in Table 2, the components, amounts, and procedure for making Part B of the first layer were as follows:

TABLE 2

| PART B | | |
|---|---|---|
| | wt % | Procedure |
| Hydroxyl Terminated Polybutadiene | 33.97 | Charge. |
| Phthalate Ester Plasticizer | 6.80 | Charge. |
| N,N Bis(2 Hydroxypropyl) Aniline | 0.34 | Charge. |
| 2-Oxepanone, polymer with 2,2-bis(hydroxymethyl)-1,3-propanediol | 1.01 | Charge and mix. |
| Calcium Carbonate | 17.00 | Charge and mix. |
| Aluminum Hydroxide | 33.97 | Charge and mix. |
| Carbon Black | 3.40 | Charge and mix. Heat to 212-220° F. (100-104.4° C.) while pulling vacuum to remove moisture. Cool down to 75-85° F. (23.8-29.4° C.). |
| C12-C13 Linear Primary Alcohol | 0.25 | Charge and mix. |
| Calcium Oxide | 0.51 | Charge and mix. |
| Calcium Hydroxide | 1.02 | Charge and mix. |
| Formic Acid Blocked Tertiary Amine | 0.03 | Charge and mix. |
| Alkali Metal Aluminum Silicate | 1.70 | Charge and mix. Pull vacuum for 10-15 minutes at −30 inches Hg (−101,571 Pa). |
| Total Weight | 100.00 | |

The first layer adhesive composition of the invention was tested under various conditions (as shown in the following Example 2/Table 3) against a commercially available adhesive, PR-1425, a polysulfide-containing adhesive available from PPG Industries, Inc., Pittsburgh, Pa. A majority of the tests were conducted according to Aerospace Standard AS5127/1 Revision A. The Taber Abrasion Test was conducted according to ASTMD4060 and the Moisture Vapor Transmission (MVT) Test was conducted according to ASTMF1249. For the Cure Rate tests, the hardness reading standard "Rex A" was used. The higher the Rex A reading, the harder the material. Generally, a material of medium hardness has a Rex A reading of between 45-70. The Peel Tests measured the strength of the adhesion of the adhesive to the listed substrate. For PR-1425, the Peel Test was evaluated by manually pulling the adhesive from the substrate once it had cured for approximately seven days. If the adhesive was able to be pulled off, "Off" is listed as a result. If the adhesive remained, "OK" is listed as the result. For the composition of Example 1, a more specific evaluation was conducted wherein a machine pulled the adhesive from the substrate after curing for approximately seven days. The machine pulled on either a thin piece of fabric or aluminum foil that had been embedded on the surface of the adhesive. While pulling, the machine is able to quantify the pounds per inch weight of material (PIW), i.e., the pounds per linear inch (PLI) of weight strength needed to remove the adhesive from the substrate. The "(100)" indicates 100% cohesive strength or failure at the adhesive/substrate interface. 100% indicates that none of the substrate is visible after a Peel Test is performed, i.e., a portion of the adhesive remained adhered to the substrate. Thus, if 10% of the substrate is visible, a score of "90", meaning 90% cohesive strength, would be given. The Peel Test rows marked as 3% NaCl indicate that the adhesive/substrate combination was soaked in a 3% NaCl/$H_2O$ bath for approximately another seven days after the initial curing at 120° F. (48.8° C.) before evaluating the adhesion.

Example 2

TABLE 3

| PROPERTY | PR-1425 | EXAMPLE 1 |
|---|---|---|
| Slump, inches (cm) | | |
| Initial | 0.15 (.381) | 0.12 (.3048) |
| 30 minutes | 0.45 (1.143) | 0.10 (.254) |
| Application Life, grams/minute | | |
| 30 minutes | 45 | 37 |
| 60 minutes | 25 | 4 |
| Tack Free Time at 75° F. (24° C.), hours | | 3 |
| Cure Rate at 75° F. (24° C.), Rex A | | |
| 3½ hours | 0 | 33 |
| 24 hours | 53 | 61 |
| 7 days | 55 | 70 |
| Low Temp. Flex at −65° F. (−54° C.) | Passed | Passed |
| Taber Abrasion (H18, 1 kg), grams loss | | |
| After 1000 cycles | 1.3612 | 1.0751 |
| MVT, gm/$m^2$/day @ 100° F. (38° C.) | 22.28 | 6.17 |
| Crazing Test | | |
| Acrylic | Passed | Passed |
| Polycarbonate | Passed | Passed |
| Tensile Strength and Elongation, psi (%) | | |
| Dry | 512 (357) | 680 (160) |
| JRF (7 days @ 140° F. (60° C.)) | 208 (350) | 270 (120) |
| DI Water (7 days @ 140° F. (60° C.)) | 144 (217) | 690 (150) |
| Swell in De-ionized Water | | |
| 7 days @ 140° F. (60° C.), % | 23.38 | 114 |
| Weight Loss in De-ionized Water, % | | |
| 7 days @ 140° F. (60° C.) + 24 hours @ 120° F. (49° C.) Oven | 8.12 | 3.79 |
| Weight Loss in JRF, % | | |
| 7 days @ 140° F. (60° C.) + 24 hours @ 120° F. (49° C.) Oven | 8.12 | 14.71 |
| PEEL TESTS | | |
| Acrylic | | |
| Dry | Off | 28 PIW* (100) |
| 3% NaCl | Off | 27 PIW* (100) |
| Polycarbonate | | |
| Dry | Off | 20 PIW* (100) |
| 3% NaCl | Off | 28 PIW* (100) |
| Phenolic | | |
| Dry | OK | 28 PIW* (100) |
| 3% NaCl | OK | 28 PIW* (100) |
| Stainless Steel, unabraded | | |
| Dry | Off | Off |
| 3% NaCl | Off | Off |
| Soda-Lime-Silica Glass, Air Side | | |
| Dry | Off | 21 PIW* (100) |
| 3% NaCl | Off | 22 PIW* (100) |
| Herculite II ® Glass, Air Side | | |
| Dry | OK | 29 PIW* (100) |
| 3% NaCl | Off | 25 PIW* (100) |
| Nesatron ® Coated Glass, Coated Side | | |
| Dry | Off | Off |
| 3% NaCl | Off | Off |
| NESA ® Coated Glass, Coated Side | | |
| Dry | OK | Off |
| 3% NaCl | Off | Off |

*pounds per inch weight

The results shown in Table 3 demonstrate the following characteristics of the first layer of the adhesive composition of Example 1, which incorporates features of the present invention, when compared to PR-1425: 1) Improved Taber abrasion; 2) A three-fold reduction in moisture vapor transmission rate; 3) A viscosity range from very low to comparable to PR-1425; 4) Adhesion without primers to acrylics, polycarbonate, phenolic, Herculite II® Glass, and soda-lime-silica glass; 5) Good low temperature flexibility at −65° F. (−54° C.); 6) Lower weight loss in de-ionized water; and 7) Improved stiffness, as shown by a higher tensile reading under dry, JRF, and de-ionized water conditions.

The second layer of the multi-layer aircraft adhesive according to the present invention generally comprises a base component (Part C) and an accelerator component (Part D). Each component can contain one or more of each of the following: plasticizers, surfactants, crosslinking agents, adhesion promoters, moisture resisters, hardening agents, polymers, abrasion resisters, fillers, catalysts, ultraviolet (UV) light and ozone blockers, desiccants, and desiccant-forming compounds. As discussed herein, one purpose of the second layer of the aircraft adhesive of the invention is to further cover the surface of an aircraft transparency and reinforce the protective properties of the first layer of the aircraft adhesive of the invention. The second layer of the multi-layer aircraft adhesive also protects the transparency from harsh wind and water, and is sacrificial so that the glass and the frame of the aircraft are not abraded. Further, the second layer of the multi-layer adhesive of the present invention is "substantially chromate free", meaning less than 5 wt % chromate based upon the total weight of the composition, such as less than 4 wt %, such as less than 3 wt %, such as less than 2 wt %, such as less than 1 wt %, such as no intentional addition of chromate material to the composition of the second layer.

In one non-limiting embodiment, the second layer of the multi-layer aircraft adhesive according to the present invention can be directly applied and formed over at least a portion of the first layer. In a further non-limiting embodiment, the second layer of the aircraft adhesive is applied indirectly over at least a portion of the first layer as it is formed over at least a portion of a barrier layer that covers at least a portion of the first layer. The barrier layer may be composed of a non-corrosive material, such as, but not limited to the following: stainless steel, aluminum, plastic, or stretched acrylic/Lexan® (commercially available from Sabic Innovative Plastics).

The second layer of the multi-layer aircraft adhesive according to the present invention can be formed from a multi-component system, e.g., Part C and Part D. Part C can be generally characterized as a base and can contain at least one of each of the following: a polythiol functional polymer, an epoxy resin, a sulfur containing material that is different from the polythiol functional polymer, a plasticizer, and at least one filler. In one particular non-limiting embodiment, Part C of the second layer may also contain one or more of each of the following: A water intermediate, such as water-based sulfur latex (commercially available from BE Associates in Mexico), and a silane crosslinking agent, such as amino silane. One such amino silane is Silquest® Silane A-1100 (commercially available from Momentive Performance Materials). The silane crosslinking agent can be added to the composition of the second layer as needed to increase the adhesive properties of the composition.

The at least one polythiol functional polymer of the second layer can include, but is not limited to, mercaptan-terminated polysulfide polymers, such as Thioplast G-22, Thioplast G-112, and Thioplast G-12 (commercially available from Akzo Nobel-Akcros Chemicals). "Poly" can mean di, tri, or tetra. Further, the at least one polythiol functional polymer can be substituted with polyethylene, polypropylene, or a polyolefin.

In one embodiment, the at least one epoxy resin of the second layer is EPON® Resin 1001 B-80 (commercially available from Western American Specialties). However, other aromatic or non-aromatic epoxy resins now known or heretofore developed can be used in combination with or in place of EPON® Resin 1001 B-80.

The at least one sulfur containing material that is different from the polythiol functional polymer of Part C of the second layer acts as a sulfur donor and can be selected from a number of sulfur containing materials, such as, pure sulfur or a solid polysulfide rubber. In one embodiment, the at least one sulfur containing material that is different from the polythiol functional polymer of Part C of the second layer is WD-6 Latex in water dispersion (an ethylene bridged polysulfide in water, commercially available from BE Associates).

In one non-limiting embodiment, the at least one plasticizer of Part C of the second layer is a partially hydrogenated terphenyl, such as, HB-40 (commercially available from Solutia). Other plasticizers for Part C of the second layer include, but are not limited to, alkyl benzyl phthalate, dibutyl phthalate, and phthalate ester. However, other plasticizers now known or heretofore developed can be used in combination with or in place of the aforementioned plasticizers. Further, the plasticizers of Part A of the first layer, Part C of the second layer, and Part D of the second layer can be the same or different.

In a further non-limiting embodiment, the at least one filler for Part C of the second layer can include silica, such as a hydrophobic precipitated silica. One such example is Sipernat® D-13 (commercially available from The Cary Company). The silica may also be a fumed silica, such as CAB-O-SIL (commercially available from Cabot). The at least one filler for Part C of the second layer can also include calcium carbonate, such as precipitated calcium carbonate. One such example is Winnofil® SPM (commercially available from Solvay Chemicals). The at least one filler for Part C of the second layer is used for reinforcement of the second composition and increases tensile strength. The at least one filler for Part C of the second layer can also include carbon black or colloidal carbon, which also acts to provide UV protection. However, any suitable filler now known or heretofore developed in the adhesive art can be used in combination with or in place of the aforementioned fillers, such as, but not limited to, talc, mica, and barytes.

Part D of the second layer of the multi-layer aircraft adhesive according to the present invention can be generally characterized as an accelerator and can contain at least one of each of the following: a plasticizer, manganese dioxide (such as activated Manganese Dioxide Type II, commercially available from Shepherd Color Company) or lead oxide, and an alkaline agent. In one particular non-limiting embodiment, Part D of the second layer may also contain one or more of each of the following: a desiccant, a wetting agent, a processing agent, sodium stearate, a surfactant, and a filler.

In one non-limiting embodiment, the at least one plasticizer of Part D of the second layer is a partially hydrogenated terphenyl, such as HB-40 (commercially available from Solutia). Other plasticizers for Part D of the second layer include, but are not limited to, alkyl benzyl phthalate, dibutyl phthalate, and phthalate ester. However, other plasticizers now known or heretofore developed can be used in combination with or in place of the aforementioned plasticizers. Further, as previously noted, the plasticizers of Part A of the first layer, Part C of the second layer, and Part D of the second layer can be the same or different.

In one non-limiting embodiment, the at least one alkaline agent of Part D of the second layer is dipentamethylene thiuram tetrasulfide, such as Accelerator DPTT (commercially available from Akrochem Corporation). Suitable alternatives include, but are not limited to, diphenylguanidine, tetramethylguanidine, sodium hydroxide, and potassium hydroxide.

Desiccants for Part D of the second layer include Molecular Sieve Type 3A Powder (commercially available from PQ Corporation). However, any suitable desiccant/water scavenger now known or heretofore developed in the adhesive art can be used.

Wetting agents for Part D of the second layer include clay and castor derivatives. In one non-limiting embodiment, the wetting agent is a stearic acid intermediate prepared by mixing one part stearic acid with one part partially hydrogenated terphenyl, such as HB-40 (commercially available from Solutia). The wetting agent prevents the manganese dioxide in Part D of the second layer from catching on fire during mixing. It also increases the thixotropy of Part D of the second layer.

Processing agents for Part D of the second layer can be selected from any processing aid now known or heretofore developed in the adhesive art. In one non-limiting embodiment, the processing agent is sodium stearate.

Surfactants for Part D of the second layer can be selected from any surface active agents now known or heretofore developed in the adhesive art. In one non-limiting embodiment, a non-ionic surfactant, such as alkyl phenol hydroxyl polyoxyethylene is used (Triton® X-100, commercially available from SPI Supplies).

In a non-limiting embodiment, the at least one filler for Part D of the second layer can include talc, such as IT-3X (commercially available from R. T. Vanderbilt Co.) silica, such as a hydrophobic precipitated silica. However, any suitable filler now known or heretofore developed in the adhesive art can be used in combination with or in place of talc, such as, but not limited to, silica, mica, calcium carbonate, carbon black, colloidal carbon, and barytes.

In one non-limiting embodiment, the second layer of the multi-layer aircraft adhesive according to the present invention comprises two parts, Part C and Part D. Part C is generally characterized as a base containing at least one polythiol functional polymer, at least one aromatic epoxy resin, sulfur, partially hydrogenated terphenyl, silica, calcium carbonate, water intermediate, solid polysulfide rubber (e.g., WD-6 Latex in water dispersion), and carbon black to a total weight of 100%. Part D is generally characterized as an accelerator containing partially hydrogenated terphenyl, dipentamethylene thiuram tetrasulfide, dessicant (e.g., Molecular Sieve Type 3A Powder), activated manganese dioxide, stearic acid intermediate, sodium stearate, non-ionic surfactant (e.g., Triton® X-100), and talc to a total weight of 100%.

In Part C of the second layer, the sum total of the at least one polythiol functional polymer can be present at a range from 10.0 wt % to 90.0 wt %, such as 20.0 to 80.0 wt %, e.g., 63.37 wt %. The at least one aromatic epoxy resin can be present at a range from 0.01 to 10.0 wt %, such as 1.0 to 10.0 wt %, e.g., 2.99 wt %. The sulfur can be present at a range from 0.00 to 3.0 wt %, such as 0.10 to 1.0 wt %, e.g., 0.17 wt %. The partially hydrogenated terphenyl can be present at a range from 0.00 to 5.0 wt %, such as 0.01 to 0.10 wt %, e.g., 0.04 wt %. The sum total of the silica can be present at a range from 0.00 to 20.0 wt %, such as 5.0 to 15.0 wt %, e.g., 6.93 wt %. The calcium carbonate can be present at a range from 0.00 to 20.0 wt %, such as 5.0 to 15.0 wt %, e.g., 7.17 wt %. The water intermediate can be present at a range from 0.00 to 3.0 wt %, such as 0.10 to 1.0 wt %, e.g., 0.34 wt %. The solid polysulfide rubber (e.g., WD-6 Latex in water dispersion) can be present at a range from 0.00 to 3.0 wt %, such as 0.10 to 1.0 wt %, e.g., 0.45 wt %. The carbon black can be present at a range from 0.00 to 40.0 wt %, such as 10.0 to 30.0 wt %, e.g., 18.54 wt %.

In one non-limiting embodiment, Part C of the second layer is prepared as follows: charge all liquids into a vacuum-rated pot and mix using a mixer with high speed dispersion capablilities; charge dry fillers to the pot while mixing; pull vacuum and high speed disperse the mixture while de-aerating; add pre-dispersed carbon black intermediate to the pot; mix under vacuum; and empty pot. 300 gallons of Part C of the second layer can be prepared in approximately 8 hours.

In Part D of the second layer, the partially hydrogenated terphenyl can be present at a range from 5.0 wt % to 70.0 wt %, such as 10.0 to 60.0 wt %, e.g., 35.40 wt %. The dipentamethylene thiuram tetrasulfide can be present at a range from 0.01 to 10.0 wt %, such as 1.0 to 6.0 wt %, e.g., 2.55 wt %. The dessicant (e.g., Molecular Sieve Type 3A Powder) can be present at a range from 0.00 to 3.0 wt %, such as 0.10 to 1.0 wt %, e.g., 0.51 wt %. The activated manganese dioxide can be present at a range from 10.0 wt % to 80.0 wt %, such as 25.0 to 75.0 wt %, e.g., 51.09 wt %. The stearic acid intermediate can be present at a range from 0.00 to 10.0 wt %, such as 1.0 to 6.0 wt %, e.g., 1.79 wt %. In one non-limiting embodiment, the activated manganese dioxide and the stearic acid intermediate are pre-mixed together and pumped over a triple roll mill to cool the mixture before being added to the remainder of the composition of the second layer. The processing agent (e.g., sodium stearate) can be present at a range from 0.00 to 3.0 wt %, such as 0.10 to 1.0 wt %, e.g., 0.28 wt %. The non-ionic surfactant (e.g., Triton® X-100) 0.00 to 3.0 wt %, such as 0.10 to 1.0 wt %, e.g., 0.20 wt %. The talc can be present at a range from 0.00 to 20.0 wt %, such as 5.0 to 15.0 wt %, e.g., 8.17 wt %.

In one non-limiting embodiment, Part D of the second layer is prepared as follows: determine the ratio of fast and slow manganese intermediates needed to acquire proper cure rate; charge all ingredients into a pot and mix on a drum mixer or equivalent device; test resulting mixture to ensure that desired accelerator properties are met; and empty pot.

As discussed previously, Part C of the second layer functions as a base, and Part D of the second layer functions as an accelerator. In one non-limiting embodiment of the present invention, the two components are mixed at a ratio of Part C:Part D ranging from 100:8 to 100:20, e.g., Part C-100 to Part D-15 (that is, 100 parts by weight of C and 15 parts by weight of D meaning 13.0 wt. % of Part D (15/115*100=13.0%) and 87.0 wt. % of Part C (100/115*100=87.0%). The mixed components can then be vacuum degassed.

The following Example 3 illustrates a specific adhesive incorporating features of the second layer of the invention. However, it is to be understood that this is just one illustrative example of the second layer of the multi-layer adhesive and that the second layer is not limited to Example 3.

Example 3

As shown in Table 4, the components and amounts for making Part C of the second layer were as follows:

TABLE 4

| PART C | |
|---|---|
| RAW MATERIAL | wt % |
| Thioplast G-22 | 2.47 |
| Thioplast G-112 | 24.46 |
| Thioplast G-12 | 36.44 |
| EPON Resin 1001 B-80 | 2.99 |
| Sulfur | 0.17 |
| HB-40 | 0.04 |
| Silica, Sipernat D-13 | 6.59 |
| Silica CAB-O-SIL TS-720 | 0.34 |
| Calcium Carbonate Winnofil SPM | 7.17 |
| Water Intermediate | 0.34 |
| WD-6, Latex, Water Dispersion | 0.45 |
| Carbon Black Intermediate | 18.54 |

As shown in Table 5, the components and amounts for making Part D of the second layer were as follows:

TABLE 5

| PART D | |
|---|---|
| RAW MATERIAL | wt % |
| HB-40 | 35.40 |
| Akrochem Accelerator DPTT Powder | 2.55 |
| Molecular Sieve Type 3A Powder | 0.51 |
| Activated Manganese Dioxide Type II, NG | 51.09 |
| Stearic Acid Intermediate | 1.79 |
| Sodium Stearate C-1 | 0.28 |
| Triton X-100, Alkyl phenol hydroxy polyoxyethylene | 0.20 |
| IT-3X, Talc | 8.17 |

As discussed herein, a multi-layer aircraft adhesive composition useful as an aircraft hump seal is provided. The multi-layer composition has a first layer prepared from a first composition having a Part A and a Part B. Part A contains a plasticizer, a crosslinking agent, and an adhesion promoter. Part B contains a moisture resister and an abrasion resister. Further, the first layer is substantially sulfide free. The multi-layer composition has a second layer directly or indirectly formed over at least a portion of the first layer. The second layer is prepared from a second composition having a Part C and a Part D. Part C contains (i) at least one polythiol functional polymer, (ii) at least one epoxy resin, (iii) at least one sulfur containing material that is different from the at least one polythiol functional polymer, (iv) at least one plasticizer, and (v) at least one filler. Part D contains (i) at least one plasticizer, (ii) at least one of manganese dioxide or lead oxide, and (iii) at least one alkaline agent.

In a further non-limiting embodiment, the multi-layer composition has a first layer prepared from a first composition having a Part A and a Part B. Part A contains a plasticizer, a crosslinking agent, and an adhesion promoter. Part B contains a moisture resister and an abrasion resister. Further, the first layer is substantially sulfide free. The multi-layer composition has a second layer directly or indirectly formed over at least a portion of the first layer. The second layer is prepared from a second composition having a Part C and a Part D. Part C contains (i) at least one polythiol functional polymer, (ii) at least one epoxy resin, (iii) sulfur, (iv) partially hydrogenated terphenyl, (v) silica, (vi) calcium carbonate, and (vii) carbon black. Part D contains (i) partially hydrogenated terphenyl, (ii) at least one of manganese dioxide or lead oxide, and (iii) dipentamethylene thiuram tetrasulfide.

In a further non-limiting embodiment, the multi-layer composition has a first layer prepared from a first composition having a Part A and a Part B. Part A contains alkyl benzyl phthalate or phthalate ester or both, an isocyanate-containing compound, and an epoxy silane. Part B contains polybutadiene and aluminum hydroxide. Further, the first layer is substantially sulfide free. The multi-layer composition has a second layer directly or indirectly formed over at least a portion of the first layer. The second layer is prepared from a second composition having a Part C and a Part D. Part C contains (i) at least one polythiol functional polymer, (ii) at least one epoxy resin, (iii) sulfur, (iv) partially hydrogenated terphenyl, (v) silica, (vi) calcium carbonate, and (vii) carbon black. Part D contains (i) partially hydrogenated terphenyl, (ii) at least one of manganese dioxide or lead oxide, and (iii) dipentamethylene thiuram tetrasulfide.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A multi-layer aircraft adhesive composition, comprising:
   (a) a first layer prepared from a first composition comprising a Part A and a Part B, wherein Part A comprises a plasticizer, a crosslinking agent, and an adhesion promoter, wherein Part B comprises a moisture resister and an abrasion resister, and wherein the first layer is substantially sulfide free; and
   (b) a second layer directly or indirectly formed over at least a portion of the first layer, the second layer prepared from a second composition, comprising a Part C and a Part D, wherein Part C comprises:
      (i) at least one polythiol functional polymer,
      (ii) at least one epoxy resin,
      (iii) at least one sulfur containing material that is different from the at least one polythiol functional polymer,
      (iv) at least one plasticizer, and
      (v) at least one filler,
   wherein Part D comprises:
      (i) at least one plasticizer,
      (ii) at least one of manganese dioxide or lead oxide, and
      (iii) at least one alkaline agent.

2. The aircraft adhesive of claim 1, wherein the moisture resister of the first composition comprises polybutadiene and wherein the adhesion promoter of the first composition comprises an epoxy silane.

3. The aircraft adhesive of claim 1, wherein Part A of the first composition further comprises at least one of each of a surfactant, an ultraviolet light and ozone resister, and an expander.

4. The aircraft adhesive of claim 1, wherein Part B of the first composition further comprises at least one of each of a plasticizer, a hardener, a reactor, a filler, an ultraviolet light and ozone resister, an adhesion promoter, a desiccant, a catalyst, and a strengthener.

5. The aircraft adhesive of claim 1, wherein the plasticizer of Part A of the first composition is alkyl benzyl phthalate or phthalate ester or both.

6. The aircraft adhesive of claim 1, wherein the crosslinking agent of Part A of the first composition is an isocyanate-containing compound.

7. The aircraft adhesive of claim 1, wherein the moisture resister of Part B of the first composition is a hydroxyl terminated polybutadiene.

8. The aircraft adhesive of claim 1, wherein the abrasion resister of Part B of the first composition is aluminum hydroxide.

9. The aircraft adhesive of claim 1, wherein the at least one epoxy resin of Part C of the second composition is an aromatic epoxy resin.

10. The aircraft adhesive of claim 1, wherein the at least one plasticizer of Part C of the second composition is partially hydrogenated terphenyl.

11. The aircraft adhesive of claim 1, wherein the at least one filler of Part C of the second composition is selected from the group consisting of silica, calcium carbonate, and carbon black.

12. The aircraft adhesive of claim 1, wherein Part C of the second composition further comprises a silane crosslinking agent.

13. The aircraft adhesive of claim 1, wherein the at least one plasticizer of Part D of the second composition is partially hydrogenated terphenyl.

14. The aircraft adhesive of claim 1, wherein the at least one alkaline agent of Part D of the second composition is dipentamethylene thiuram tetrasulfide.

15. The aircraft adhesive of claim 1, wherein Part D of the second composition further comprises at least one filler.

16. The aircraft adhesive of claim 1, wherein Part D of the second composition further comprises a stearic acid intermediate.

17. The aircraft adhesive of claim 1, wherein Part D of the second composition further comprises a surfactant.

18. The aircraft adhesive of claim 1, wherein the second layer is substantially chromate free.

19. A multi-layer aircraft adhesive composition, comprising:
   (a) a first layer prepared from a first composition comprising a Part A and a Part B, wherein Part A comprises a plasticizer, a crosslinking agent, and an adhesion promoter, wherein Part B comprises a moisture resister and an abrasion resister, and wherein the first layer is substantially sulfide free; and
   (b) a second layer directly or indirectly formed over at least a portion of the first layer, the second layer prepared from a second composition, comprising a Part C and a Part D, wherein Part C comprises:
      (i) at least one polythiol functional polymer,
      (ii) at least one aromatic epoxy resin,
      (iii) sulfur,
      (iv) partially hydrogenated terphenyl,
      (v) silica,
      (vi) calcium carbonate, and
      (vii) carbon black wherein Part D comprises:
(i) partially hydrogenated terphenyl,
(ii) at least one of manganese dioxide or lead oxide, and
(iii) dipentamethylene thiuram tetrasulfide.

20. The aircraft adhesive according to claim 19, wherein Part A of the first composition comprises alkyl benzyl phthalate or phthalate ester or both, an isocyanate-containing compound, and an epoxy silane, and wherein Part B of the first composition comprises polybutadiene and aluminum hydroxide.

21. The multi-layer aircraft adhesive of claim 19, wherein the second layer is substantially chromate free.

22. A multi-layer aircraft adhesive composition, comprising:
(a) a first layer prepared from a first composition comprising a Part A and a Part B, wherein Part A of the first composition comprises alkyl benzyl phthalate or phthalate ester or both, an isocyanate-containing compound, and an epoxy silane, and wherein Part B of the first composition comprises polybutadiene and aluminum hydroxide, and wherein the first layer is substantially sulfide free; and
(b) a second layer directly or indirectly formed over at least a portion of the first layer, the second layer prepared from a second composition, comprising a Part C and a Part D, wherein Part C comprises:
(i) at least one polythiol functional polymer,
(ii) at least one aromatic epoxy resin,
(iii) sulfur,
(iv) partially hydrogenated terphenyl,
(v) silica,
(vi) calcium carbonate, and
(vii) carbon black
wherein Part D comprises:
(i) partially hydrogenated terphenyl,
(ii) at least one of manganese dioxide or lead oxide, and
(iii) dipentamethylene thiuram tetrasulfide.

23. The multi-layer aircraft adhesive of claim 22, wherein the second layer is substantially chromate free.

* * * * *